June 20, 1961
C. C. WAUGH
2,988,916
FLOWMETER
Filed March 3, 1955
3 Sheets-Sheet 1
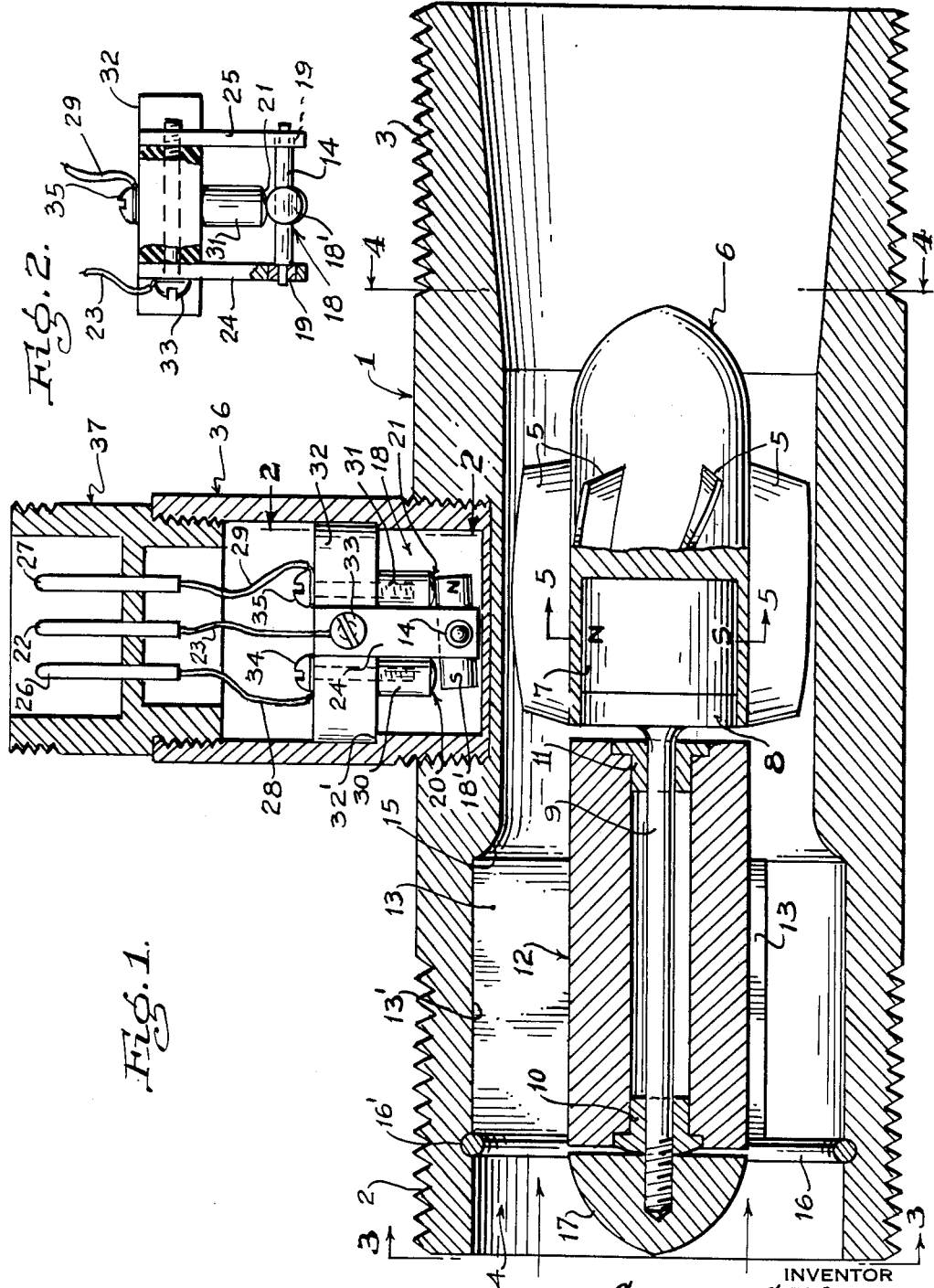
INVENTOR
CHARLES C. WAUGH
BY
Philip Subkow
ATTORNEY.

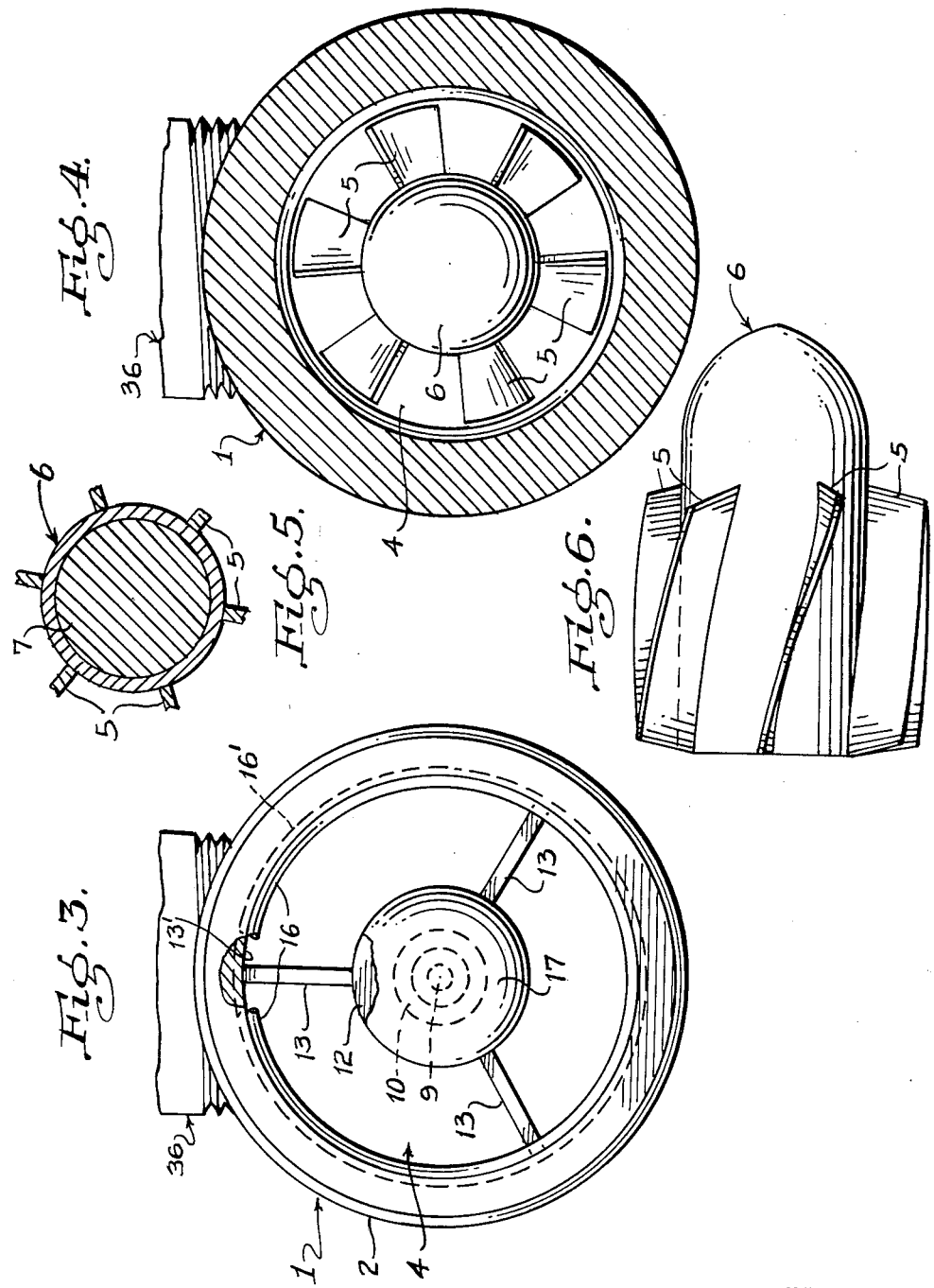

June 20, 1961 C. C. WAUGH 2,988,916
FLOWMETER
Filed March 3, 1955 3 Sheets-Sheet 3
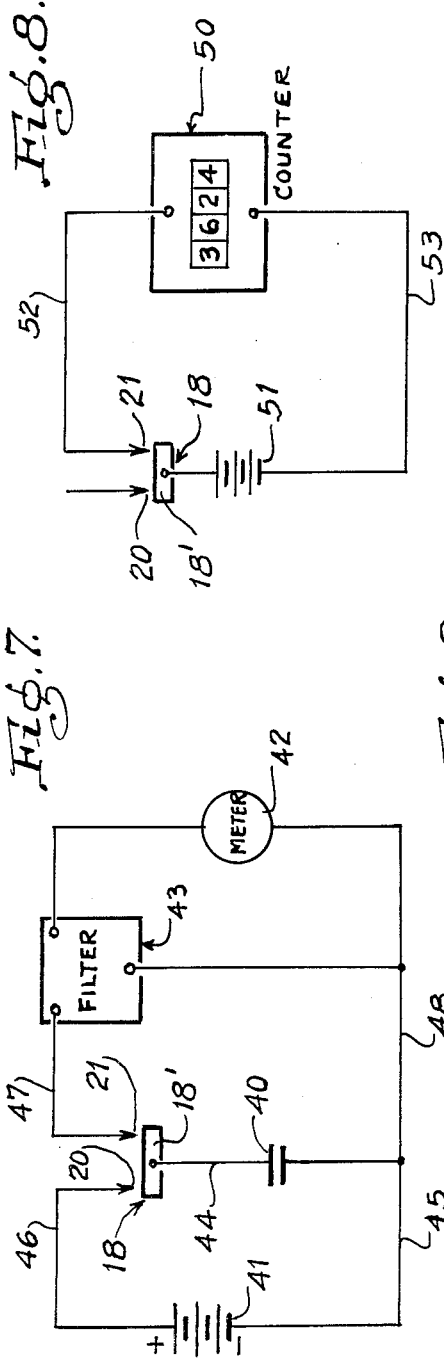
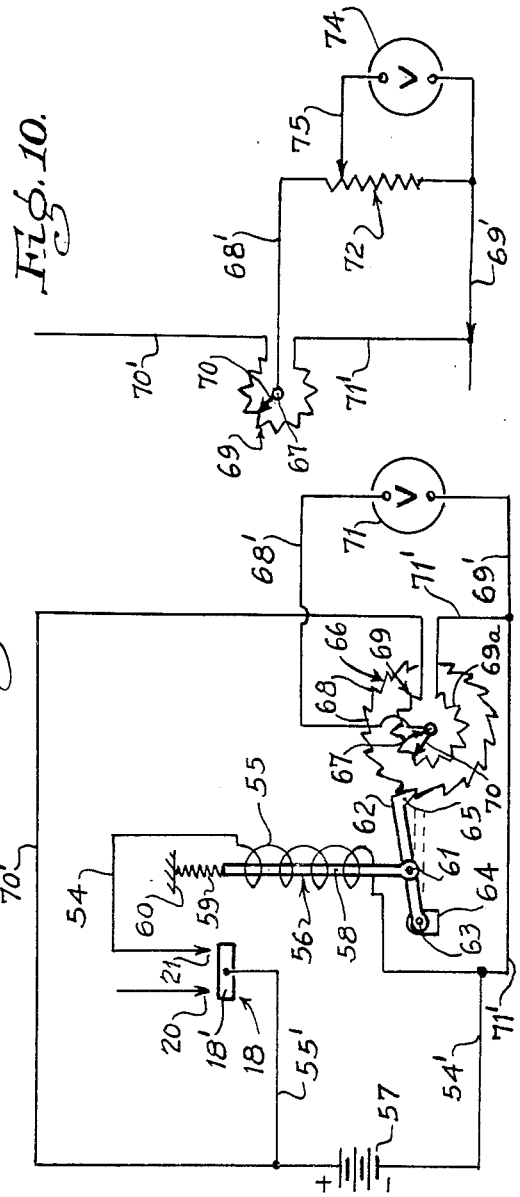
INVENTOR
CHARLES C. WAUGH
BY
ATTORNEY.

United States Patent Office 2,988,916
Patented June 20, 1961

2,988,916
FLOWMETER
Charles C. Waugh, Tarzana, Calif. (% Waugh Engineering Co., 15306 Dickens St., Sherman Oaks, Calif.)
Filed Mar. 3, 1955, Ser. No. 491,845
8 Claims. (Cl. 73—231)

This invention relates to a new and improved flowmeter for measuring fluid flow, either liquid or gaseous, employing the turbine principle. More particularly, the invention is directed to a flowmeter for dependably measuring rate or total quantity of flow of either liquids or gases supplied through conduits, e.g., in industrial and airborne applications. The invention device is particularly useful for airborne flow measurements such as flow of fluids to aircraft engines for operation thereof.

In electric current generating type flowmeters such, for example, as used in feed lines for delivering liquid or gaseous fuel to internal combustion or other engines, the flowmeter is necessarily of small size and dimensions because of the limited space available to install the same in the feed line. Therefore, the voltage and current output of the flowmeter generator is very low so that even the slightest variation thereof will seriously affect the measuring function of the flowmeter, and at low flow rates these output values are so low as to render the obtaining of accurate flow measurements very difficult.

Accordingly, one object of this invention is the provision of an improved flowmeter of the rotating turbine type, which produces an output voltage which is constant regardless of the flow rate, and thus insures constant accuracy measurement of fluid flow even at low flow rates.

Yet another object is to provide an improved flowmeter capable of accurately measuring and indicating flow rate and/or total flow of a fluid, e.g., gas, oil, gasoline, water, or any other fluid delivered through a conduit, without the use of complicated electronic circuits, and employing circuits of the utmost simplicity.

Another object is to afford a flowmeter designed so that the electric pulses developed by the flowmeter are of a high voltage level, which can be used to operate counters and other equipment directly without the use of amplifiers.

A still further object is the provision of an improved turbine type flowmeter comprising a permanent magnet type rotor, and having a novel switch mechanism mounted adjacent and associated with said rotor for producing constant voltage pulses during operation of said rotor.

Yet another object is the provision of novel and simplified circuitry particularly useful for measuring fluid flow in conjunction with the invention flowmeter.

Another object is the provision of a flowmeter having an arrangement of parts permitting rapid assembly thereof, and which is relatively inexpensive yet which is durable and reliable in operation.

Other objects and advantages of the invention will appear hereinafter.

The invention will be clearly understood from the description below of a preferred embodiment of my improved flowmeter, taken in connection with the accompanying drawings wherein:

FIG. 1 is a cross section of the flowmeter, shown partly in full for clarity;

FIG. 2 is a section taken on line 2—2 of FIG. 1;

FIG. 3 is an end view taken on line 3—3 of FIG. 1;

FIG. 4 is a view of the other end of the device taken on line 4—4 of FIG. 1;

FIG. 5 is a section taken on line 5—5 of FIG. 1;

FIG. 6 is a plan view of a portion of the rotor of the flowmeter, including the turbine blades thereon;

FIG. 7 is a schematic circuit diagram for measuring flow rate by means of my flowmeter;

FIG. 8 is a schematic circuit diagram for measuring total flow by means of my flowmeter;

FIG. 9 is still another schematic circuit diagram for measuring total flow employing my flowmeter; and FIG. 10 is yet another schematic circuit diagram for measuring the total flow employing my flowmeter.

Referring to FIGS. 1 to 6 of the drawings, the flowmeter comprises a hollow case 1 which can be coupled at opposite ends to piping by means of the external threads 2 and 3. The case is constructed of a nonmagnetic material such as aluminum, certain stainless steels, or plastic. Mounted substantially in the center of bore 4 of the case 1 is a rotor 6 about the periphery of which are disposed a series of turbine blades 5, shown as six in number in FIG. 4. The blades 5 are of a helical shape so that a rotary force is imparted to the rotor 6 on passage of fluid through bore 4, due to reaction of the blades to the moving fluid. The axis of the rotor is on the longitudinal axis of the case, and sufficient clearance is provided between the outer edges of the blades 5 and the wall of bore 4 to permit freedom of rotation of the rotor.

The interior of the rotor 6 contains a cylindrical magnet 7, permanently magnetized across its diameter, the magnet being mounted on the axis of the rotor for rotation thereby. The magnet is held in place and the rotor is supported by an enlarged end portion 8 of the shaft 9, said enlarged portion being pressed into the open end of rotor 6. The shaft 9 is mounted along the longitudinal axis of the case 1, and is supported by sleeve bearings 10 and 11, which are pressed into the opposite ends of a tubular bearing support 12, to permit free rotation of the shaft 9 and rotor 6. The bearing support 12 is held concentric within the bore 4 of the case by means of radial vanes 13 connected to the outer periphery of the bearing support, the outer edges of the vanes engaging the wall portion 13' of the bore of case 1. The vanes 13 also serve to straighten the flow of fluid through the case. The bearing support 12 and vanes 13 thereof are prevented from moving longitudinally within the bore 4 by abutment of the downstream ends of the vanes 13 with a shoulder 15 formed on the wall of bore 4, and by engagement of the upstream ends of the vanes with a removable snap ring 16 positioned in a circumferential groove 16' on wall portion 13' of the bore. The shaft 9 is restrained from longitudinal movement within bearings 10 and 11, by means of a thrust nut 17 which is threaded onto the upstream end of shaft 9.

Mounted externally of the fluid passage 4 is a cylindrical switch case 36, one end of which is threaded into the flowmeter case 1 opposite magnet 7 of the rotor. Switch case 36 is also constructed of a nonmagnetic material such as aluminum, plastic, or certain stainless steels. A magnetic switch 18 is mounted in the case 36. Switch 18 comprises an armature 18', which is a cylindrical magnet permanently magnetized along its length. The magnetic armature 18' is centrally mounted on a shaft 14 which is free to rotate or pivot in bearings 19 in support arms 24 and 25, shaft 14 and armature 18' being aligned with rotor magnet 7. Rotation of armature 18' is limited to a small angle, e.g., to approximately 5°, by two electrical contacts 20 and 21. As the rotor 6 rotates due to movement of turbine blades 5 by passage of fluid through case 1, the north and south poles of the rotor magnet 7 alternately approach the magnetic armature 18'.

When the north pole of magnet 7 approaches the magnetic armature 18' the south pole of said armature is attracted to the north pole of magnet 7, while simultaneously the north pole of armature 18' is repelled, rotating said armature into the position shown in FIG. 1, with the north pole of armature 18' in engagement with contact 21. When the south pole of the magnet 7 approaches the magnetic armature 18′, the armature rotates in the opposite direction until the south pole of the armature 18′ touches contact 20. In this manner a single throw double pole switch is provided which operates from one position to the other and returns once for each full rotation of the rotor 6 and magnet 7.

Since the switch 18 is mounted so that the armature 18′ is substantially parallel to the turbine rotor at all times, there is little magnetic attraction between the switch and the rotating magnet 7 to retard the rotation of the rotor 6. This is because the north and south poles of the magnetic armature 18′ are at all times approximately equidistant from the rotating magnet 7. Thus, there is no net attraction or repulsion in a direction tending to retard rotation of the rotor 7. The net axial thrust is taken up by the thrust bearings 10 and 11 with no effect on rotor rotation.

Magnetic armature 18′ is preferably silver plated for good electrical conductivity, and the two contacts 20 and 21 engaged by the magnet are made of a material of high magnetic permeability such as soft iron, and preferably faced with a thin layer of fine silver. The silver plating preferably provided on armature 18′ and contacts 20 and 21 is advantageous because it is resistant to corrosion which would result in high contact resistance. Also, since silver is a nonmagnetic material, this prevents the armature 18′ from undesirably sticking to the contacts 20 and 21, thus preventing rotation of the armature 18′.

The contacts 20 and 21 are each connected to the lower ends of magnetic cores 30 and 31, respectively, said cores being composed of a material of high magnetic permeability such as soft iron so as to attract the magnetic armature 18′ and hold it against either contact 20 or 21, depending upon the position into which the armature is forced by the rotor magnet 7.

The support arms 24 and 25 for the shaft 14 are attached to an insulating support 32 by means of a screw 33 and the magnetic cores 30 and 31 are attached to said insulating support by means of screws 34 and 35. The insulating support 32 is mounted on a shoulder 32′ on the inner wall of the switch case 36.

An electrical connector 37 is threaded into the top of switch case 36, said connector having mounted therein pins 22, 26, and 27. Electrical connection between pin 22 and armature 18′ is made through a wire 23 connecting said pin with screw 33, support arms 24 and 25, bearings 19 and shaft 14. The fixed contact 20 is electrically connected to pin 26 through a wire 28 connected between said pin and screw 34, screw 34 and magnetic core 30, and contact 21 is electrically connected to pin 27 through a wire 29 between said pin and screw 35, screw 35, and magnetic core 31.

The operation of switch 18 can be used to indicate flow rate or totalized flow, employing the circuits described below.

A circuit for flow rate indication is shown in FIG. 7. In this circuit a capacitor 40 is placed in series with the movable contact or armature 18′ of switch 18, and a battery 41 or other source of constant voltage, by means of leads 44 and 45, the other side of the battery being electrically connected through lead 46 to one of the fixed contacts 20. Across the other fixed contact 21 and the capacitor 40 is connected, by means of leads 47 and 48, a meter 42 or other current-measuring instrument. Each time switch 18 operates to engage the fixed contact 21, a pulse containing a constant charge is discharged through the meter. Thus, the number of charges in a given period of time will be proportional to the speed of rotation of the rotor 6 and to the flow rate of fluid passing through the flowmeter case 1. When these pulses are averaged out, either by a filter circuit, represented generally by numeral 43, or by the mechanical lag of the meter itself, a deflection is obtained which is exactly proportional to the frequency of the pulses and to the flow rate.

In FIG. 8 is shown a circuit for totalizing fluid flow through the flowmeter. Connected in series with one of the fixed contacts 21 of switch 18, and the movable armature 18′ thereof, by means of leads 52 and 53, is an electrically operated counter, represented generally by numeral 50, and a battery 51. The counter may be either of the electromechanical or electronic type, both of which are conventional and commercially available. Each operation of the switch 18, i.e., through engagement of armature 18′ with contact 21, registers one count on the counter, thereby totalizing the number of revolutions of the rotor 6 due to fluid flow through the flowmeter. Since the total number of revolutions of the rotor is a direct function of the total volume of fluid passed through the flowmeter, an accurate record of the total flow is obtained.

Another novel form of totalizing circuit arrangement is shown in FIG. 9. In this case, coil 55, of a solenoid 56, and a battery 57 are connected between a fixed contact 21 of switch 18 and the movable armature 18′ thereof by means of leads 54, 54′ and 55′. The movable core 58 of solenoid 56 is biased upwardly by means of spring 59 attached to a support 60, the lower end of core 58 being pivotally connected at 61 to a lever 62 in turn pivotally attached at one end by means of pivot pin 63 to a support 64. The opposite end of lever 62 is in the form of a pawl 65 which makes contact with a ratchet wheel 66 mounted on a shaft 67. The teeth 68 of the ratchet wheel face in a clockwise direction. A circular potentiometer or voltage divider 69 is also positioned about shaft 67 adjacent ratchet wheel 66, the potentiometer having a movable arm 70 mounted on shaft 67 for rotation therewith. A voltmeter 71 is connected across the potentiometer by means of leads 68′ and 69′, lead 68′ being electrically connected at one end to the potentiometer arm 70 through shaft 67. The potentiometer coil 69a is connected in parallel with the battery 57 by means of leads 70′ and 71′.

It is thus seen that each time an electrical signal is applied by engagement of armature 18′ with contact 21 of switch 18, the solenoid 56 is energized, causing core 58 thereof to move downward to pivot lever 62 clockwise a fixed amount. Lever 62 thus rotates ratchet wheel 66 and shaft 67 through a constant angle for each impulse, and hence the potentiometer arm 70 advances along the potentiometer coil by a small fixed amount for each revolution of rotor 6 produced by passage of fluid through the flowmeter. The position of the potentiometer arm 70 with respect to the potentiometer coil 69a is thus a function of the total number of pulses which have been applied, and the totalized flow can be read by measuring the voltage across the movable arm 70 of the potentiometer.

Where indication of rate of flow is required in weight units rather than volume units, the circuits of FIGS. 7 and 9 can be modified to include a specific gravity adjustment, e.g., in the nature of an additional potentiometer dividing the output between the density ratio of the fluid whose flow is being measured to water as reference. In other words, the additional potentiometer provides the proper density factor. FIG. 10 shows schematically a modification of the circuit of FIG. 9 for this purpose. In FIG. 10 an aditional potentiometer 72 is connected across potentiometer 69, and a voltmeter 74 is connected across potentiometer 72. The arm 75 of potentiometer 72 is manually adjusted to provide the proper density factor for the fluid whose flow is being measured, as described above.

The advantages of the invention device are as follows:
(1) Highly accurate measurement of flow rate and total flow is obtained without the use of electronic circuitry, as has been necessary in previous turbine flow meters. (2) The electric pulses developed by the flowmeter are of a high voltage level, which can be used to operate counters and other equipment directly without the use of amplifiers. (3) The output voltage of the meter is constant regardless of the flow rate, whereas in generating types of flowmeters the output voltage is approximately proportional to the flow rate and is, therefore, very low at the low flow rates. (4) The high voltage output avoids difficulties that have been incurred with other turbine flowmeters due to interference by weak external magnetic fields, ground currents, and other extraneous effects. (5) The magnetic switch is inherently vibration proof because the armature is perfectly balanced on its shaft and is not subject to movement due to linear acceleration of the meter. (6) The magnetic switch is further insured against false operation due to vibration, by its magnetic latching action against the soft iron in the two stationary contacts. (7) There is very little magnetic attraction between the switch and the rotating magnet to retard the rotation of the turbine. (8) This flowmeter is particularly advantageous in applications where simplicity and reliability are of great importance, such as in airborne flow measurements and industrial applications where remote indication of flow rate and total flow is required.

While I have described a particular embodiment of my invention for the purpose of illustration, it should be understood that various modifications and adaptations thereof may be made within the spirit of the invention as set forth in the appended claims.

I claim:

1. A turbine type flowmeter which comprises a conduit having a fluid passage, a fluid actuated rotor positioned in said passage and mounted to rotate through a complete 360° revolution, a permanent magnet mounted on said rotor for rotation therewith, a switch positioned adjacent said rotor and said magnet, said switch being located externally of said passage, said switch comprising a permanent magnetic armature and spaced-apart magnetizable electrical contacts positioned adjacent said armature lengthwise thereof, said armature positioned substantially parallel to the axis of said rotor and being pivoted intermediate its ends for movement into alternate engagement with each of said contacts on rotation of said rotor and magnet, and circuit means associated with said contacts and said armature for measuring fluid flow in said passage in response to actuation of said switch.

2. In a flowmeter, a case having a fluid passage therein, a fluid actuated rotor positioned in said passage, a cylindrical permanent magnet mounted within and coaxially with the rotor for rotation thereby, a switch housing connected to said case adjacent said rotor and said magnet, a switch in said housing and located externally of said fluid passage, said switch comprising a silver plated magnetic cylindrical armature magnetized along its length and positioned substantially parallel to the axis of said rotor, a pair of spaced magnetic cores, a pair of electrical contacts each mounted on a separate one of said cores, said contacts being located closely adjacent said armature and spaced from each other lengthwise of said armature, said contacts being composed of a material of high magnetic permeability and plated with a silver layer, said armature and said contacts being in alignment with said rotor magnet, said armature being pivoted intermediate its ends for rotation through a small angle into alternate engagement with each of said contacts on rotation of said rotor and magnet.

3. A turbine type flowmeter comprising a case having a fluid passage therein, a fluid actuated rotor positioned in said passage and mounted to rotate through a complete 360° revolution, a cylindrical permanent magnet mounted within and coaxially with the rotor for rotation thereby, a switch housing connected to said case adjacent said rotor and said magnet, a switch in said housing and located externally of said fluid passage, said switch comprising a silver plated magnetic cylindrical armature permanently magnetized along its length and positioned substantially parallel to the axis of said rotor, a pair of spaced magnetic cores, a pair of electrical contacts each mounted on a separate one of said cores, said contacts being located closely adjacent said armature and spaced from each other lengthwise of said armature, said countacts being composed of a material of high magnetic permeability and plated with a silver layer, said armature and said contacts being in alignment with said rotor magnet, said armature being pivoted intermediate its ends for rotation through a small angle into alternate engagement with each of said rotor and magnet, and circuit means connected to said armature and to at least one of said cores for measuring fluid flow in said passage in response to actuation of said armature on rotation of said rotor.

4. In apparatus for measuring fluid flow, a case having a fluid passage therein, a fluid actuated rotor positioned in said passage and mounted to rotate through a complete 360° revolution, a permanent magnet mounted within and coaxially with the rotor for rotation thereby, a shaft supporting said rotor, a tubular bearing support positioned about said shaft and spaced therefrom, bearings for said shaft disposed at opposite ends of said tubular member, means on said shaft for limiting axial movement thereof, vanes for mounting said bearing support in said passage, means for preventing axial movement of said vanes, a switch housing connected to said case adjacent said rotor and said magnet, a switch in said housing and located externally of said fluid passage, said switch comprising a magnetic armature positioned and maintained substantially parallel to the axis of said rotor, spaced-apart electrical contacts located adjacent said armature, and spaced from each other lengthwise of said armature, said armature being pivoted intermediate its ends for rotation through a small angle into alternate engagement with each of said contacts on rotation of said rotor and said rotor magnet.

5. In apparatus for measuring fluid flow, a case having a fluid passage therein, a fluid actuated rotor positioned in said passage, a cylindrical permanent magnet mounted within and coaxially with the rotor for rotation thereby, a shaft supporting said rotor, a tubular bearing support positioned about said shaft and spaced therefrom, bearings for said shaft disposed at opposite ends of said tubular member, means on said shaft for limiting axial movement thereof, vanes on said bearing support for mounting said bearing support in said passage, means for preventing axial movement of said vanes, a switch housing connected to said case adjacent said rotor and said magnet, a switch in said housing and located externally of said fluid passages, said switch comprising a silver plated magnetic cylindrical armature magnetized along its length and positioned substantially parallel to the axis of said rotor, a pair of spaced magnetic cores, a pair of electrical contacts each mounted on a separate one of said cores, said contacts being located closely adjacent said armature, and spaced from each other lengthwise of said armature, said contacts being composed of a material of high magnetic permeability and plated with a silver layer, said armature and said contacts being in alignment with said rotor magnet, said armature being pivoted intermediate its ends for rotation through a small angle into alternate engagement with each of said contacts on rotation of said rotor and magnet.

6. A turbine type flowmeter which comprises a conduit having a fluid passage, a fluid actuated rotor positioned in said passage and mounted to rotate through a complete 360° revolution, a permanent magnet mounted on said rotor for rotation therewith, a switch positioned adjacent said rotor and said magnet, said switch being located externally of said passage, said switch comprising a magnetic armature and spaced-apart electrical contacts positioned adjacent said armature, said armature being pivoted intermediate its ends for movement into alternate engagement with each of said contacts on rotation of said rotor and magnet, and an integrating circuit connected between at least one of said contacts and said armature for measuring total flow of fluid through said passage for a given time, said circuit including in series a solenoid and a constant voltage source, a potentiometer connected across the voltage source and including a potentiometer arm, means for changing the position of said potentiometer arm with respect to said potentiometer, means actuated by said solenoid on energization thereof through engagement of said armature with at least one of said contacts, for operating said changing means, and means for measuring the voltage across one end of said potentiometer and the potentiometer arm.

7. A turbine type flowmeter which comprises a conduit having a fluid passage, a fluid actuated rotor positioned in said passage and mounted to rotate through a complete 360° revolution, a permanent magnet mounted on said rotor for rotation therewith, a switch positioned adjacent said rotor and said magnet, said switch being located externally of said fluid passage, said switch comprising a magnetic armature and spaced-apart electrical contacts positioned adjacent said armature, said armature being pivoted intermedite its ends for movement into alternate engagement with each of said contacts on rotation of said rotor and magnet, and an integrating circuit connected between at least one of said contacts and said armature for measuring total flow of fluid through said passage for a given time, said circuit including in series a solenoid and a constant voltage source, a circular potentiometer connected across the voltage source, a movable potentiometer arm in contact with said potentiometer, said arm being mounted for rotation on a shaft, a ratchet wheel mounted on said shaft, a pawl for rotating said ratchet wheel, means connecting said solenoid with said pawl, said pawl moving said ratchet wheel and said potentiometer arm through a constant angle on actuation of said pawl by said solenoid on energization thereof in response to actuation of said switch through engagement of said armature with at least one of said contacts, and means for measuring the voltage across one end of said potentiometer and the potentiometer arm.

8. In a flowmeter, a case having a fluid passage therein, a fluid actuated rotor positioned in said passage, a cylindrical permanent magnet mounted within and coaxially with the rotor for rotation thereby, a switch housing connected to said case adjacent said rotor and said magnet, a switch in said housing and located externally of said fluid passage, said switch comprising a magnetic cylindrical armature magnetized along its length and positioned substantially parallel to the axis of said rotor, a pair of spaced magnetic cores, a pair of electrical contacts each mounted on a separate one of said cores, said contacts being located closely adjacent said armature and spaced from each other lengthwise of said armature, said contacts being composed of a material of high magnetic permeability, said armature and said contacts being in alignment with said rotor magnet, said armature being pivoted intermediate its ends for rotation through a small angle into alternate engagement with each of said contacts on rotation of said rotor and magnet.

References Cited in the file of this patent

UNITED STATES PATENTS

| | | |
|---|---|---|
| 697,492 | Kelley et al. | Apr. 15, 1902 |
| 1,398,792 | Paulin | Nov. 29, 1921 |
| 1,779,783 | Sylvander et al. | Oct. 28, 1930 |
| 1,970,412 | Bates | Aug. 14, 1934 |
| 2,109,953 | Bates | Mar. 1, 1938 |
| 2,259,104 | Finch | Oct. 14, 1941 |
| 2,299,406 | Potter | Oct. 20, 1942 |
| 2,324,262 | Lamb | July 13, 1943 |
| 2,438,674 | Newell | Mar. 30, 1948 |
| 2,529,481 | Brewer | Nov. 14, 1950 |
| 2,600,011 | MacDonald et al. | June 10, 1952 |
| 2,607,221 | Babson et al. | Aug. 19, 1952 |
| 2,649,712 | Dale | Aug. 25, 1953 |
| 2,668,662 | Roth | Feb. 9, 1954 |
| 2,756,928 | Hudson et al. | July 31, 1956 |
| 2,782,638 | Von Arx | Feb. 26, 1957 |